US010987784B2

(12) United States Patent
Seith

(10) Patent No.: US 10,987,784 B2
(45) Date of Patent: Apr. 27, 2021

(54) CORDLESS IMPACT TOOL WITH BRUSHLESS, SENSORLESS, MOTOR AND DRIVE

(71) Applicant: Ingersoll-Rand Industrial U.S., Inc., Davidson, NC (US)

(72) Inventor: Warren A. Seith, Bethlehem, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 435 days.

(21) Appl. No.: 15/903,426

(22) Filed: Feb. 23, 2018

(65) Prior Publication Data

US 2019/0262977 A1 Aug. 29, 2019

(51) Int. Cl.
*B25B 19/00* (2006.01)
*B25B 21/02* (2006.01)
(Continued)

(52) U.S. Cl.
CPC .............. *B25B 21/02* (2013.01); *B25B 19/00* (2013.01); *B25B 21/00* (2013.01); *H02P 6/182* (2013.01); *H02P 6/21* (2016.02)

(58) Field of Classification Search
CPC . B25B 21/02; H02P 6/182; H02P 6/20; H02P 6/21
See application file for complete search history.

(56) References Cited

U.S. PATENT DOCUMENTS 5,298,838 A 3/1994 Peters et al.
5,726,543 A * 3/1998 Park .................... H02P 6/21
318/400.11

(Continued)

FOREIGN PATENT DOCUMENTS

CN 1945936 A 4/2007
CN 102712086 A 10/2012
(Continued)

OTHER PUBLICATIONS

Ingersoll Rand Products—Feb. 19, 2018—W132 3/8" 20V Impact Wrench—https://www.ingersollrandproducts.com/en-us/power-tools/products/impactools.html.
(Continued)

*Primary Examiner* — Andrew M Tecco
*Assistant Examiner* — Eyamindae C Jallow
(74) *Attorney, Agent, or Firm* — Kevin E. West; Advent, LLP

(57) ABSTRACT

An impact tool of the present disclosure provides an impact mechanism having a hammer and an anvil, the hammer being rotatable about a first axis and to periodically impact the anvil to drive rotation of the anvil about the first axis. The electric motor includes a plurality of pole pairs of windings and a rotor that is rotatable with respect to consecutively energized pole pairs of windings. No encoder or sensor is electronically coupled to the electric motor to detect a position of at least one magnet attached to the rotor with respect to at least one pole pair when the rotor is in a stopped condition. When the rotor is in the stopped condition, the motor controller energizes the at least one pole pair to initiate rotation and detect a back EMF generated by movement of the rotor without a sensor or encoder to indicate the predetermined location of the at least one magnet attached to the rotor with respect to the at least one pole pair.

13 Claims, 6 Drawing Sheets

(51) Int. Cl.
*B25B 21/00* (2006.01)
*H02P 6/182* (2016.01)
*H02P 6/21* (2016.01)

(56) References Cited

U.S. PATENT DOCUMENTS

| | | | |
|---|---|---|---|
| 7,998,157 B2 | 8/2011 | Culp et al. | |
| 8,692,494 B2 | 4/2014 | Murata | |
| 9,059,651 B2* | 6/2015 | Purfuerst | H02P 6/18 |
| 9,479,097 B2* | 10/2016 | Kang | H02P 6/21 |
| 2001/0043806 A1* | 11/2001 | Gorti | H02K 29/08 |
| | | | 388/800 |
| 2002/0047351 A1* | 4/2002 | Araki | H02P 6/20 |
| | | | 310/68 B |
| 2004/0251860 A1 | 12/2004 | Ehsani et al. | |
| 2007/0018598 A1 | 1/2007 | Nichols | |
| 2009/0079374 A1* | 3/2009 | De Four | H02P 6/182 |
| | | | 318/400.34 |
| 2009/0174355 A1* | 7/2009 | Su | H02P 6/182 |
| | | | 318/400.33 |
| 2010/0148710 A1* | 6/2010 | Lim | H02P 6/20 |
| | | | 318/400.11 |
| 2010/0327788 A1* | 12/2010 | Laulanet | H02P 6/182 |
| | | | 318/400.11 |
| 2011/0152029 A1* | 6/2011 | Rudolph | B25F 5/001 |
| | | | 475/271 |
| 2013/0186661 A1 | 1/2013 | Okubo et al. | |
| 2013/0342146 A1* | 12/2013 | Lawrence | H02P 6/185 |
| | | | 318/400.33 |
| 2014/0285127 A1* | 9/2014 | Kang | H02P 21/34 |
| | | | 318/400.11 |
| 2015/0017891 A1 | 1/2015 | Nordstrom | |
| 2015/0022129 A1* | 1/2015 | Lu | H02P 6/185 |
| | | | 318/400.06 |
| 2015/0069864 A1 | 3/2015 | Nagahama et al. | |
| 2015/0165604 A1* | 6/2015 | Bartoszek | B25B 21/02 |
| | | | 173/1 |
| 2015/0336249 A1 | 11/2015 | Iwata et al. | |
| 2016/0354889 A1* | 12/2016 | Ely | B25B 23/18 |
| 2017/0093314 A1* | 3/2017 | Esvelt | H02P 6/22 |

FOREIGN PATENT DOCUMENTS

| | | |
|---|---|---|
| CN | 102950585 A1 | 3/2013 |
| CN | 102971113 A | 3/2013 |
| CN | 102983671 A | 3/2013 |
| CN | 107635726 A | 1/2018 |
| EP | 2060002 A2 | 5/2009 |
| EP | 2190628 A1 | 6/2010 |

OTHER PUBLICATIONS

Digi-Key Electronics—Jun. 19, 2013—https://www.digikey.com/en/articles/techzone/2013/jun/controlling-sensorless-bldc-motors-via-back-emf.
European Search Report dated Jun. 25, 2019; EP 19158870.6; Filed on Feb. 22, 2019.
State Intellectual Property Office of People's Republic of China, First Office Action and Search Report in corresponding application No. 201910129296.X, dated Jun. 3, 2020, 14 pp.

* cited by examiner

CORDLESS IMPACT TOOL WITH BRUSHLESS, SENSORLESS, MOTOR AND DRIVE

TECHNICAL FIELD AND SUMMARY

The present disclosure relates to cordless impact tools, and particularly to a cordless impact tool that employs a sensorless brushless motor.

An impact tool, also known as an impact wrench, may be used to mechanically install and remove fasteners. An electrically actuated impact tool includes an electric motor coupled to an impact mechanism that converts torque provided by the electric motor into a constant series of powerful rotary blows directed from one or more attached hammers against an anvil that is either integrally formed or otherwise coupled to an output drive. The output drive is configured to hold and rotate the particular fastener that is being driven.

Electrically actuated impact tools of the present disclosure may employ a brushless DC (BLDC) motor to operate the tool's hammer and anvil impact mechanism. As it is believed known in the art, the only way to start a BLDC motor on an impact tool is to determine the initial position of the magnets on the rotor relative to the several pole pairs of windings on the motor's stator. This is because when the motor is at rest, the motor controller does not know where the magnets on the rotor are located in relation to the stator. As such, the motor controller does not know which pole pair of windings to activate first to begin spinning the rotor.

Sensorless BLDC motors exist but it is believed the only way for those motors to begin rotating, without advance knowledge of where the magnet on the rotor is in relation to at least one of the several pole pairs on the stator, is for the rotor to have no resistance against the rotor that would prevent it from freely rotating. Known algorithms such as those that randomly charge pole pairs may work so long as there is no resistance on the rotor upon startup. In these instances, the appropriate pole pair of windings will eventually be energized to cause the rotor to begin rotating so long as there is no resistance acting on the rotor. Once this happens, a back electromagnetic force (EMF) is generated by the spinning rotor. The back EMF will indicate to the motor controller the relative location of the rotor with respect to the stator. The motor controller can then tune operation of the rotor via energizing the appropriate pole pairs of windings in specific sequence to achieve optimum rotational output.

Again, this is believed only possible when the rotor is free to rotate. In the impact tool environment, however, when first starting the impact tool, its output drive may already be coupled to a fastener intending to be driven. This means that there will be substantial resistance applied to the output drive and, thus, the rotor at startup. It is believed the rotor cannot rotate to detect its back EMF, and thus, identify its position. For this reason, the sensors and encoder are employed to determine the position of the rotor at startup before the rotor begins rotating.

An illustrative embodiment of the present disclosure is contrary to the state-of-the-art. The impact tool of the present disclosure employs a sensorless BLDC motor counterintuitive to the state of the art. Upon startup, the pole pairs of windings may be energized, randomly, in sequence, or back and forth until at least some movement of the rotor, albeit minute movement, occurs and is detected from its back EMF. Possibly as little as one turn of the rotor may be employed which is enough to detect the rotor's position. Once that detection is made, the motor controller may properly commutate the stator field so the rotor properly rotates. This is accomplished without any sensors or encoder attached to the motor controller to detect rotor location. This may also be accomplished with the output drive of the impact tool engaging a fastener that exerts resistance to the direction of the output drive's rotational movement.

Accordingly, an illustrative embodiment of the present disclosure provides an impact tool which comprises: an impact mechanism that includes a hammer and an anvil, the hammer being rotatable about a first axis and to periodically impact the anvil to drive rotation of the anvil about the first axis; a motor controller; a trigger; a battery power source; and a brushless DC motor having a plurality of pole pairs of windings and a rotor that is rotatable with respect to consecutively energized pole pairs of windings of the plurality of pole pairs of windings; wherein no encoder or sensors are electronically coupled to the brushless DC motor to detect a position of at least one magnet attached to the rotor with respect to at least one pole pair of the plurality of pole pairs of windings; wherein the trigger actuates the motor controller that receives power from the battery power source such that the motor controller will energize at least one pole pair of the plurality of pole pairs to detect a back EMF generated by movement of the rotor that started from rest; and wherein the brushless DC motor will begin rotating with a fastener engaged with the impact mechanism to create resistance against rotation of the rotor.

In the above and other embodiments, the impact tool may further comprise: the motor controller energizing the plurality of pole pairs selected from the group consisting of in sequence, randomly, and alternately to create at least some rotation by the rotor to generate the back EMF to be detected by the motor controller; and not more than one revolution of the rotor is sufficient to generate back EMF sufficient to be detected by the motor controller.

Another illustrative embodiment of the present disclosure provides an impact tool assembly which comprises: an impact mechanism that includes a hammer and an anvil, the hammer being rotatable about a first axis and to periodically impact the anvil to drive rotation of the anvil about the first axis; a motor controller; a trigger; a power source; and an electric motor having a plurality of pole pairs of windings and a rotor that is rotatable with respect to consecutively energized pole pairs of windings of the plurality of pole pairs of windings; wherein no encoder and sensor is electronically coupled to the electric motor to detect a position of at least one magnet attached to the rotor with respect to at least one pole pair of the plurality of pole pairs of windings when the rotor is at rest; wherein the trigger actuates the motor controller that receives power from the power source such that the motor controller will energize the at least one pole pair of the plurality of pole pairs to detect a back EMF generated by movement of the rotor that started from rest.

In the above and other embodiments, the impact tool may further comprise: an electric motor that begins rotating with a fastener coupled to the impact mechanism to create resistance against rotation of the rotor; and the electric motor is a brushless DC motor.

Another illustrative embodiment of the present disclosure provides an impact tool which comprises: an impact mechanism that includes a hammer and an anvil, the hammer being rotatable about a first axis and to periodically impact the anvil to drive rotation of the anvil about the first axis; a motor controller; and an electric motor located in the impact tool; wherein the electric motor includes a plurality of pole pairs of windings and a rotor that is rotatable with respect to consecutively energized pole pairs of windings of the plurality of pole pairs of windings; wherein no encoder or sensor is electronically coupled to the electric motor to detect a position of at least one magnet attached to the rotor with respect to at least one pole pair of the plurality of pole pairs of windings when the rotor is in a stopped condition; and wherein when the rotor is in the stopped condition the motor controller energizes the at least one pole pair of the plurality of pole pairs of windings a back EMF generated by movement of the rotor without the sensor and encoder to indicate the predetermined location of the at least one magnet attached to the rotor with respect to the at least one pole pair of the plurality of pole pairs of windings.

In the above and other embodiments, the impact tool may further comprise: the motor controller energizing the plurality of pole pairs selected from the group consisting of in sequence, randomly, and alternately to create at least some rotation by the rotor to generate the back EMF to be detected by the motor controller; not more than one revolution of the rotor is sufficient to generate the back EMF sufficient to be detected by the motor controller; the electric motor will begin rotating with a fastener engaged with the impact mechanism which creates resistance to rotation of the rotor; the electric motor is a brushless DC motor; and a power source that is activated by a trigger that supplies power to the motor controller which energizes the at least one pole pair of the plurality of pole pairs of windings and does not receive a signal to indicate the predetermined location of the at least one magnet attached to the rotor with respect to the at least one pole pair of the plurality of pole pairs of windings when the rotor is in the stopped condition.

Another illustrative embodiment of the present disclosure provides a method of initiating rotation of an output drive of an impact tool. The method comprises the steps of: providing an impact mechanism that includes a hammer and an anvil, the hammer being rotatable about a first axis and to periodically impact the anvil to drive rotation of the anvil about the first axis, wherein the anvil rotates an output drive about the first axis, a brushless DC motor having a plurality of pole pairs of windings and a rotor that is rotatable with respect to consecutively energizing the plurality of pole pairs of windings, a motor controller, a trigger, and a power source, wherein no encoder or sensor is coupled to the brushless DC motor to detect a position of at least one magnet attached to the rotor with respect to at least one pole pair of the plurality of pole pairs of windings; actuating the trigger; supplying electricity to the motor controller from the power source in response to actuating the trigger; energizing at least one pole pair of the plurality of pole pair of windings of the brushless DC motor when the rotor is at rest; rotating the rotor of the brushless DC motor from rest by one revolution or less; generating a back EMF from the rotating rotor; and detecting the relative position of the rotor with respect to the at least one of the pole pairs of the plurality of pole pairs of windings based on rotating the rotor of the brushless DC motor from rest to one revolution or less.

Additional features and advantages of the impact tool assembly will become apparent to those skilled in the art upon consideration of the following detailed descriptions.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein, illustrates embodiments of the impact tool assembly and such exemplification is not to be construed as limiting the scope of the impact tool assembly in any manner.

DETAILED DESCRIPTION OF THE DRAWINGS

Figure 1:
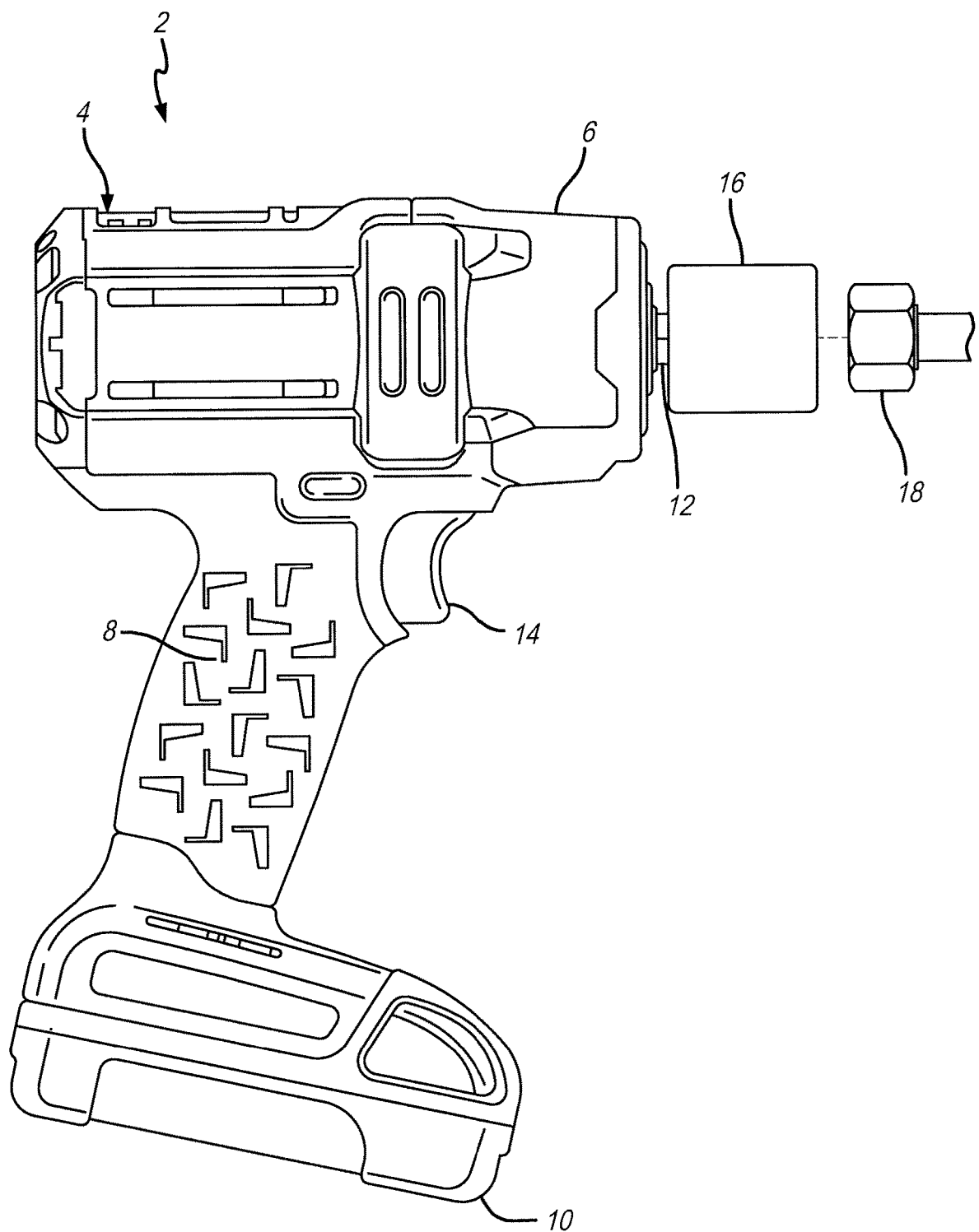
FIG. 1 is a side view of the impact tool and fastener.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Impact tools that employ a BLDC motor to operate their hammer and anvil impact mechanisms are known. An example of such an impact tool is the Ingersoll-Rand W5132 20V impact wrench. Such tool provides sufficient power and is light enough to create an effective cordless handheld impact tool. This tool employs a BLDC motor with a stationary stator and a rotor that spins or rotates with respect to the stator. Typically the stator includes a series of opposed pole pairs of windings wound with a wire. Three or more of these pole pairs of the stator may surround the rotor. Each pair of opposed windings of the pole pairs may be sequentially energized to create a moving magnetic field. Typically, the rotor includes one or more magnets located between each pole of the series of pole pairs. The magnet is attracted to the magnetic field generated by each of the pole pairs. Accordingly, if the pole pairs of the stator are energized or commuted in sequence about the stator, the magnet of the rotor will be attracted to this moving magnetic field causing the magnet to follow the magnetic field, thus, causing the rotor to rotate.

Employing the BLDC motor in an impact tool, however, comes with a cost premium. This is because BLDC motors in impact tools require the additional encoder or multiple sensors in order to operate. When the rotor in the impact tool rotates and then stops, it is likely unpredictable where the magnet on the rotor will come to rest in relation to the stator's pole pairs. When the BLDC motor restarts, it needs to know where the stator is located in relation to the rotor in advance of rotating the rotor. This is so the closest pole pair of windings to the stator magnet, and related to the direction the rotor intends to rotate, is actuated first. The stator and rotor in the BLDC motor cannot independently provide positional information to identify the location of the rotor magnet relative to any one of the pole pairs of windings prior to rotating. In other words, in order to start a BLDC motor, the relative positions of the rotor and stator need to be known, but there is nothing on the rotor or stator that can identify their relative positions to each other.

To solve this problem, a plurality of Hall sensors or an encoder are added to the motor assembly to identify where the magnet on the rotor is located relative to the pole pairs of windings on the stator. Such sensors may include Hall Effect sensors, optical sensors, or resolvers. Each type has the ability to detect the location of the magnet on the rotor and send a signal to the encoder. The encoder can then transmit that information to the motor controller which can then determine the poll pair to energized first.

For an impact tool, typically a plurality of Hall Effect sensors are placed on the rear of the motor and the output signal wires are connected to the motor controller. The Hall board is often located adjacent the motor, typically behind the motor opposite the rotor output. The encoder board is then wired to the motor controller. As such, when the impact tool is activated, one of the first steps taken before the motor begins rotating, is for the Hall sensors to determine the position of the rotor relative to the stator. The Hall sensors then tell the motor controller the location of the rotor with respect to the pole pairs. The motor controller then identifies which poll pair to activate first to begin properly rotating the rotor.

This system is complex and relatively costly. First, all of the Hall sensors, typically three in the case of a three phase motor, are positioned at strategic locations on the BLDC motor. These Hall sensors are then wired to the motor controller. The Hall sensors are wired to and supplied power from the motor controller. This translates into several additional components and manufacturing steps to create the impact tool. Second, impact tools experience a lot of vibration during both the constant impact sequences as well as when driving the fastener itself. All of the connections necessary between the sensors and encoder, as well as the encoder and motor controller, serve as potential points of failure which may occur in the impact tool environment. Accordingly, all the connections between those structures must be robust and be secure to withstand this environment. This results in added cost in the form of more parts and manufacturing steps for the several structures, all having the mere purpose of detecting the location of the rotor before BLDC motor startup.

Outside of the cordless impact tool art, sensorless BLDC motor systems do exist. Such systems were created for the purpose of simplifying BLDC motor use. These sensorless BLDC motors are simpler in that they dispense with the Hall sensors or encoder that determine the initial position of the rotor. To compensate for this, various algorithms and other means have been developed to begin rotating the rotor without benefit of knowing where the rotor's initial position is relative to the stator. For example, the pole pairs may be energized at random until the rotor begins moving. When the motor begins moving, it generates back EMF. Back EMF is a voltage which opposes the power supplied by the motor controller. The presence of back EMF is transmitted by the wires connecting the motor controller to the BLDC motor. The windings of a conventional electric motor also act like a generator to generate potential in the windings. This voltage is the EMF. A secondary magnetic field is also generated that resists the motor's rotation. This is the "back" EMF. Once back EMF is generated by the rotating rotor, the motor controller can use it to determine the position of the rotor with respect to the pole pairs. The motor controller can then adjust operation of the BLDC motor accordingly to achieve proper rotation. It will be appreciated by the skilled artisan that other algorithms exist to cause the rotor in a BLDC motor to rotate.

A component of effectively starting a sensorless BLDC motor from rest to drive speed is to ensure there is no resistance on the rotor that may prevent it from spinning. The sensorless system relies on algorithms to energize the pole pars to force the rotor to spin, even if not effectively or efficiently. The rotor just needs to spin. Once this occurs, the back EMF generated to locate the rotor and tune operation of the motor with that information can be accomplished. And this is why sensorless BLDC motors are not believed useful in the impact tool environment. If the rotor cannot spin, the back EMF cannot be detected. If there is resistance on the rotor, it is believed the rotor cannot begin spinning and thus not effectively startup the motor from rest. Propellers in model airplanes and boats, for example, can use less expensive BLDC motors because their rotors do not receive substantial resistance when attempting to start. Many other applications exist where no resistance is applied to the rotor at startup. In such applications, sensorless BLDC motors prove useful.

In the impact tool environment, the rotor may be oriented such that its output drive is in connection with a fastener. This connection creates substantial resistance against the rotational movement of the rotor. Such resistance requires substantial torque to overcome. As a consequence, because sensorless BLDC motors are believed to require free rotation of the rotor in order to operate, they are unsuitable for the impact tool applications.

Despite this belief, it is possible to employ a sensorless BLDC motor in an impact tool even if the impact tool's output drive cannot freely rotate. In an illustrative embodiment of the present disclosure, a sensorless BLDC motor may be used in an impact tool even when a load or resistance is applied onto the output drive before startup. Upon activation of the tool, the BLDC motor may start operation in an "open loop" mode. An open-loop system, also referred to as non-feedback system, is a type of continuous control system in which the output has no influence or effect on the control action of the input signal. In other words, in an open-loop control system the output is neither measured nor "fed back" for comparison with the input. This starts a fixed commutation time interval based on rotor inertia and time to accelerate the motor. At this point, the motor controller will arbitrarily energize one or more of the pole pairs. The controller will continue doing so until some motion from the rotor is detected. If no motion occurs, the controller may energize different pole pairs in different order. If any rotor movement occurs, even slight, the phase wires will be able to detect the back EMF while supplying power to the pole pairs. It will be appreciated by the skilled artisan that the sequence of energizing the pole pairs may be done in sequence, randomly, or energize alternate pole pairs back and forth to try to rock the rotor enough to detect its position.

Once the rotor begins moving slightly, the back EMF signal generated by that brief rotation is detectable by the motor controller. When the motor controller applies voltage to the motor phase leads, the back EMF generated at the motor pushes back with its own voltage. This back EMF (voltage) can be detected at the controller via voltage sensing circuitry. The open loop mode is then closed allowing the motor controller to operate the BLDC motor. At this point the commutation will be stable, thereby allowing full power and normal operation of the BLDC motor.

A side view of impact tool assembly 2, according to the present disclosure, is shown in FIG. 1. As depicted, impact tool assembly 2 includes a housing 4, hammer case 6, handle 8, and battery pack 10. An output spindle 12 extends from hammer case 6, and is the structure that couples to a fastener 18 through an intermediary socket 16 to either drive-in or unscrew same. Indeed, it will be fastener 18 coupled to output spindle 12 that prevents free rotation of the motor's rotor. Hammer case 6 contains impact mechanism 22 (see FIG. 2). The BLDC motor 20 (see FIG. 2) is located in housing 4. And lastly, motor controller 24 (see FIG. 2) may illustratively be located in handle 8. Trigger 14, when activated, is configured to draw power from battery 10 to begin rotating rotor 28 (see FIG. 2) in motor 20 inside housing 4. This begins driving impact mechanism 22 (see FIG. 2) in hammer case 6 which will rotate output spindle 12. Torque generated by impact mechanism 22 is applied to fastener 18 to either drive-in or unscrew same. As is appreciated from this view, a socket 16 or other intermediary coupling structure may be removably attached to output spindle 12 and engage fastener 18. As is further appreciated in this view, having a fastener attached to a socket on the end of an impact tool and engaging another structure is a typical configuration of the impact tool when it begins running. As previously discussed, because of this, sensors are needed on the motor in order to know where the rotor location is relative to the stator windings so the controller knows which pole pairs of windings to energize first.

Figure 2:
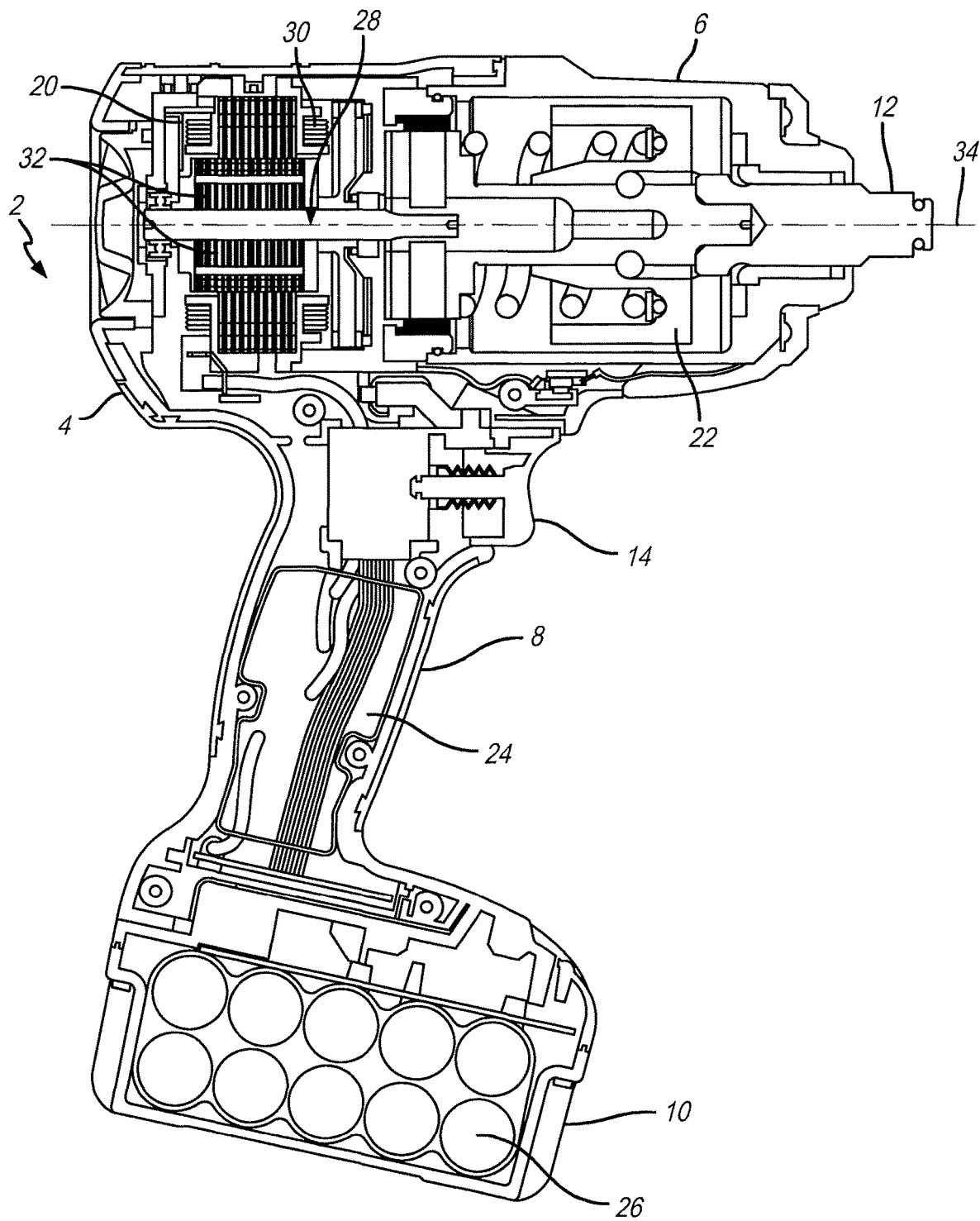
FIG. 2 is a side cross-sectional view of the impact tool.

A side cross-sectional view of impact tool assembly 2 is shown in FIG. 2. Here, the different mechanisms inside impact tool assembly 2 are depicted. For example, shown is BLDC motor 20 located in housing 4. In hammer case 6 resides impact mechanism 22 with output spindle 12 extending therefrom. Handle 8 includes motor controller 24 and trigger 14 which are electronically tied to batteries 26 that are part of battery pack 10. As these are the basic components that will operate impact tool assembly 2, no encoder or sensors are required to be tied to both the motor and motor controller in order to begin rotating rotor 28 inside stator 30 of brushless motor 20 to ultimately rotate output spindle 12. The skilled artisan will appreciate that the exact rotational position of the magnet(s) in rotor 20 with respect to pole pairs 32 (or other pole pairs in BLDC motor 20) will not be known when rotor 28 is at rest. And although one set of pole pairs is shown, the skilled artisan understands that several pole pairs exist on stator 30 and are energized in sequence to cause rotor 28 to rotate about axis 34.

Figure 3:
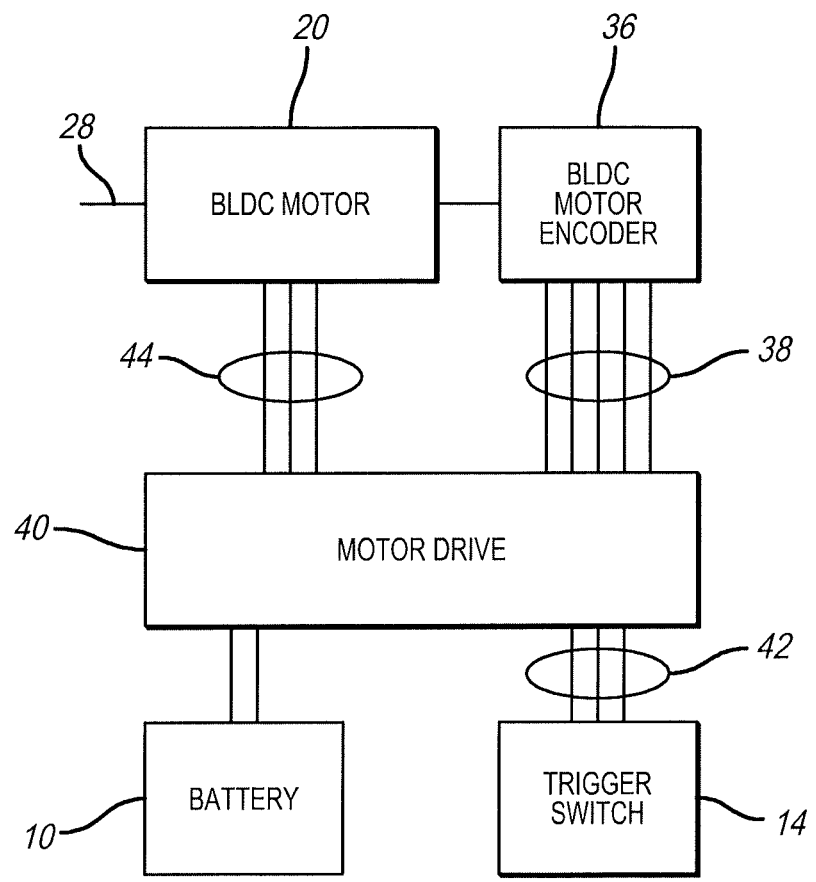
FIG. 3 is a PRIOR ART diagrammatic view of an impact tool.

A PRIOR ART diagrammatic view of an impact tool is shown in FIG. 3. As represented here, motor 20 is coupled to output rotor 28, along with battery pack 10, and trigger 14 can be similar to that of impact tool assembly 2 shown in FIGS. 1 and 2. In this diagrammatic view, this PRIOR ART impact tool includes an encoder 36 electronically coupled to sensors 41 (see PRIOR ART FIG. 4) that detect the position of rotor 28 with respect to stator 30 while rotor 28 is at rest. Wires 38 electronically couple encoder 36 to PRIOR ART motor drive 40. Here, trigger 14, which is electronically coupled to motor drive 40 via wires 42, begins the sequence of detecting the rotor's location with respect to the pole pairs in motor 20, by instructing encoder 36 to determine this position using sensors 41 (see also FIG. 4). Once this occurs, motor drive 40 sends signals through phase wires 44 to begin energizing the correct pole pair. This creates the magnetic field that will attract the magnet on rotor 28, based on the positional information received by motor drive 40, from encoder 36, to cause rotor 28 to begin rotating. Such is the conventional manner for the initiating sequence to move the rotor.

Figure 4:
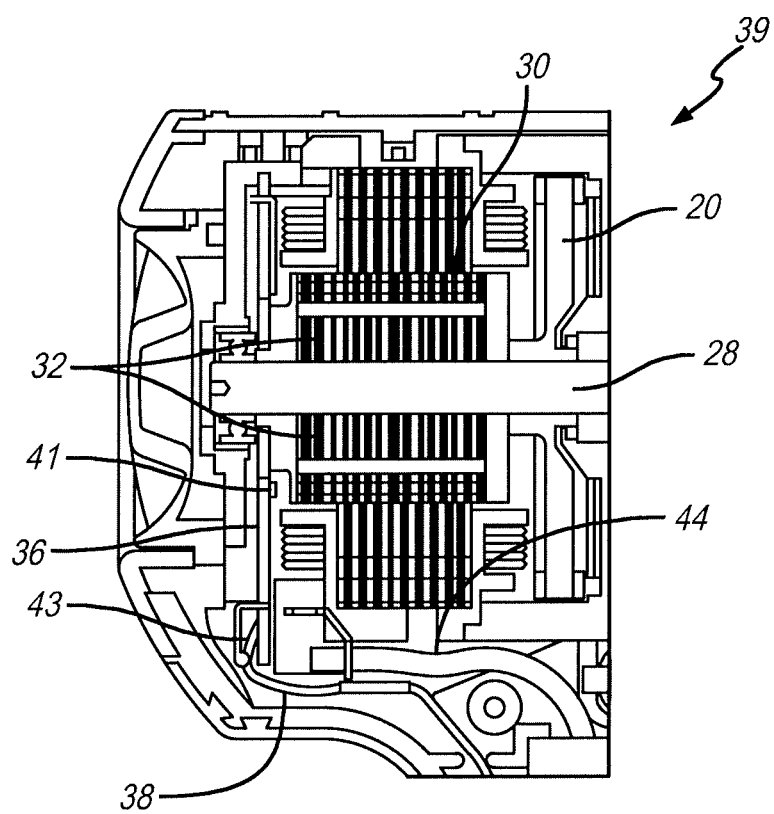
FIG. 4 is a side cross-sectional detail view of a portion of the PRIOR ART impact tool.

A side cross-sectional detail view of a portion of a PRIOR ART impact tool 39 is shown in FIG. 4. This view shows motor 20 which can be the same brushless motor that is used in impact tool assembly 2. Here, however, sensors such as a Hall Effect sensor 41 is illustratively positioned on the back of motor 20. In a typical impact tool such as impact tool 39, multiple Hall Effect sensors—often 3—are placed about the back of brushless motor 20 so it can detect the relative position of the magnet on rotor 28 relative to the pole pairs such as pole pair 32 on stator 30. Encoder 36 is illustratively located on the back of motor 20, sometimes with the Hall Effect sensors such as sensor 41 attached thereto. This view also shows an encoder connector 43 that attaches wires 38 to both encoder 36 and motor drive 40 (see, also, PRIOR ART FIG. 3). As can be appreciated by the skilled artisan upon reading this disclosure, adding the encoder, sensors, connectors, and wires to the motor and controller inside an impact tool adds both cost and potential points of failure.

Figure 5:
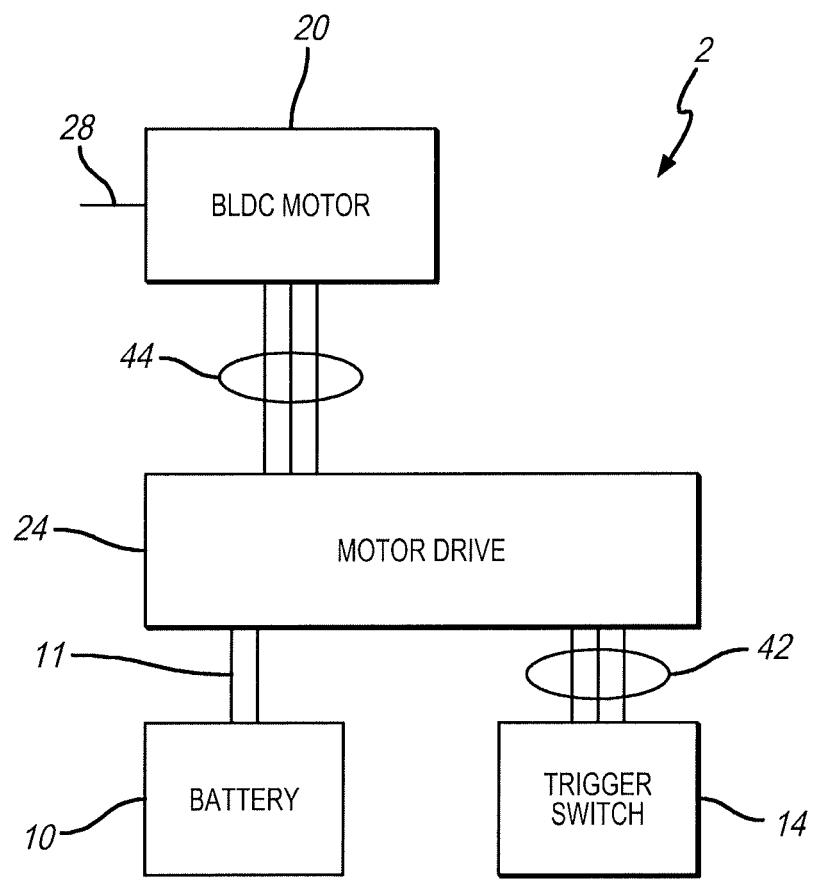
FIG. 5 is a diagrammatic view of components of the impact tool of the present disclosure.

A diagrammatic view of components of impact tool assembly 2 of the present disclosure is shown in FIG. 5. Here, motor controller 24 is electronically coupled to trigger switch 14 via wires 42 and BLDC motor 20 via motor phase wires 44. Battery 10 is also electronically coupled to motor controller 24 via wires 11. Noticeably absent is any encoder or sensors and wires associated therewith, as contrasted with PRIOR ART FIG. 3. This view in FIG. 5 demonstrates the enhanced simplicity of impact tool assembly 2 as compared to PRIOR ART impact tool 39. When trigger switch 14, through wires 42, activate motor controller 24 with power supplied from battery pack 10 through wires 11, motor phase wires 44 begin activating one or more of the pole pairs and BLDC motor 20. As previously discussed, motor controller 24 may activate one pole pair either in sequence or random, or activate alternating pole pairs in attempts to move rotor 28 at least some amount so it begins generating back EMF. Trapezoidal waveforms generated by the back EMF are used to determine the energized sequence of the pole pairs. Motor controller 24 may calculate the appropriate commutation timing to operate motor 20 as intended.

Figure 6:
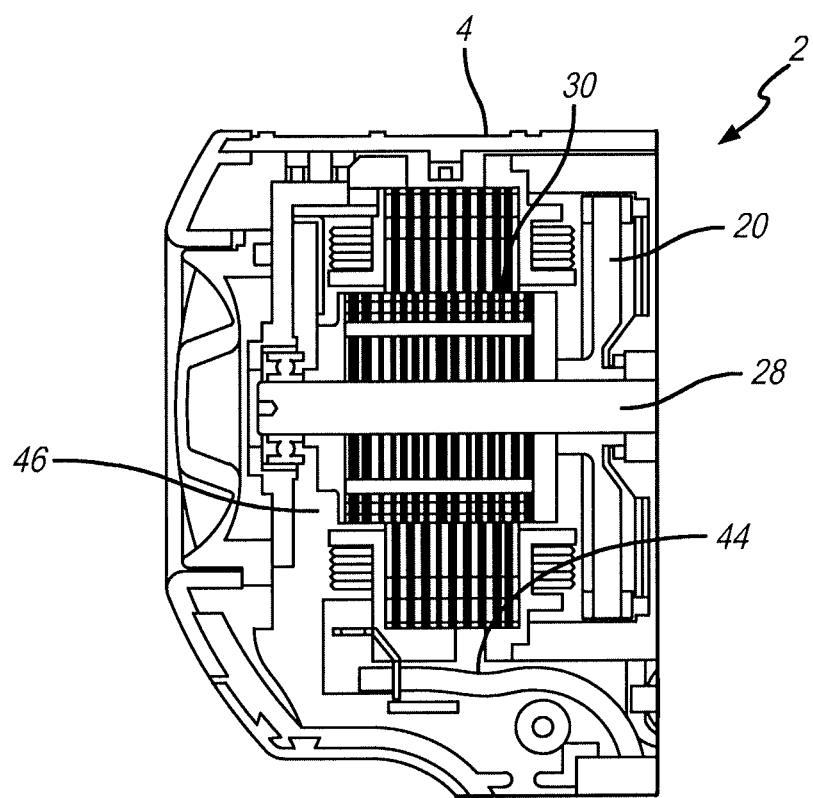
FIG. 6 is a side detailed cross-section of housing 4 of the impact tool of the present disclosure.

A side detailed cross-section of housing 4 of impact tool assembly 2 is shown and FIG. 6. Here, in contrast to that shown in PRIOR ART FIG. 4, there is no encoder or sensors at the rear portion 46 of BLDC motor 20. Simply, having phase wires 44 connected to motor 20 causing rotor 28 to move to at least some extent with respect to pole pairs 32 of stator 30 will allow the back EMF to be read. This allows motor controller 24 (see, also, FIG. 5) to detect relative positioning of the rotor with respect to the stator in order to begin fully rotating rotor 28. This is the case even with a fastener, such as fastener 18 coupled to output spindle 12.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. An impact tool comprising:
an impact mechanism that includes a hammer and an anvil, the hammer being rotatable about a first axis and to periodically impact the anvil to drive rotation of the anvil about the first axis;
a motor controller;
a trigger;
a battery power source; and
a brushless DC motor having a plurality of pole pairs of windings and a rotor that is rotatable with respect to consecutively energized pole pairs of windings of the plurality of pole pairs of windings;
wherein no encoder or Hall sensor is electronically coupled to the brushless DC motor to detect a position of at least one magnet attached to the rotor with respect to at least one pole pair of the plurality of pole pairs of windings;
wherein the trigger actuates the motor controller that receives power from the battery power source such that the motor controller is configured to 1.) energize a first set of pairs of the plurality of pole pairs of windings in a first order while a resistance to rotation of the rotor prevents the energized first set of pairs from moving the rotor, 2.) determine no movement of the rotor occurs, 3.) energize a second set of pairs of the plurality of pole pairs of windings in a second order, and 4.) detect a back electromagnetic force generated by movement of the rotor that started from rest while the motor controller was energizing the second set of pairs of the plurality of pole pairs in the second order; and
wherein the brushless DC motor will begin rotating with a fastener coupled to the impact mechanism that creates the resistance to rotation of the rotor while energizing the second set of pairs.

2. The impact tool of claim 1, wherein the motor controller energizes the plurality of pole pairs selected from the group consisting of in sequence, randomly, and alternately to create at least some rotation by the rotor to generate the back electromagnetic force to be detected by the motor controller.

3. The impact tool of claim 1, wherein not more than one revolution of the rotor is sufficient to generate back electromagnetic force sufficient to be detected by the motor controller.

4. An impact tool comprising:
an impact mechanism that includes a hammer and an anvil, the hammer being rotatable about a first axis and to periodically impact the anvil to drive rotation of the anvil about the first axis;
a motor controller;
a trigger;
a power source; and
an electric motor having a plurality of pole pairs of windings and a rotor that is rotatable with respect to consecutively energized pole pairs of windings of the plurality of pole pairs of windings;
wherein no encoder or sensors are integrated to the electric motor to detect a position of at least one magnet attached to the rotor with respect to at least one pole pair of the plurality of pole pairs of windings when the rotor is at rest;
wherein the trigger actuates the motor controller that receives power from the power source such that the motor controller is configured to 1.) energize a first set of pairs of the plurality of pole pairs of windings in a first order while a resistance to rotation of the rotor prevents the energized first set of pairs from moving the rotor, 2.) determine no movement of the rotor occurs, 3.) energize a second set of pairs of the plurality of pole pairs of windings in a second order, and 4.) detect a back electromagnetic force generated by movement of the rotor that started from rest while the motor controller was energizing the second set of pairs of the plurality of pole pairs in the second order.

5. The impact tool of claim 4, wherein the electric motor will begin rotating with a fastener coupled to the impact mechanism to create the resistance against rotation of the rotor.

6. The impact tool of claim 4, wherein the electric motor is a brushless DC motor.

7. An impact tool comprising:
an impact mechanism that includes a hammer and an anvil, the hammer being rotatable about a first axis and to periodically impact the anvil to drive rotation of the anvil about the first axis;
a motor controller; and
an electric motor located in the impact tool;
wherein the electric motor includes a plurality of pole pairs of windings and a rotor that is rotatable with respect to consecutively energized pole pairs of windings of the plurality of pole pairs of windings;
wherein no encoder or sensor is electronically coupled to the electric motor to detect a position of at least one magnet attached to the rotor with respect to at least one pole pair of the plurality of pole pairs of windings when the rotor is in a stopped condition; and
wherein when the rotor is in the stopped condition the motor controller is configured to 1.) energize a first set of pairs of the plurality of pole pairs of windings in a first order while a resistance to rotation of the rotor prevents the energized first set of pairs from moving the rotor, 2.) determine no movement of the rotor occurs, 3.) energize a second set of pairs of the plurality of pole pairs of windings in a second order to create movement of the rotor and 4.) detect a back electromagnetic force generated by movement of the rotor without the sensor or encoder to indicate the predetermined location of the at least one magnet attached to the rotor with respect to the plurality of pole pairs of windings.

8. The impact tool of claim 7, wherein the motor controller energizes the plurality of pole pairs selected from the group consisting of in sequence, randomly, and alternately to create at least some rotation by the rotor to generate the back electromagnetic force to be detected by the motor controller.

9. The impact tool of claim 7, wherein not more than one revolution of the rotor is sufficient to generate the back electromagnetic force sufficient to be detected by the motor controller.

10. The impact tool of claim 7, wherein the electric motor will begin rotating with a fastener engaged with the impact mechanism which creates the resistance to rotation of the rotor.

11. The impact tool of claim 7, wherein the electric motor is a brushless DC motor.

12. The impact tool of claim 7, further comprising a power source that is activated by a trigger that supplies power to the motor controller which energizes the plurality of pole pairs of windings and does not receive a signal to indicate the predetermined location of the of at least one magnet attached to the rotor with respect to the at least one pole pair of the plurality of pole pairs of windings when the rotor is in the stopped condition.

13. A method of initiating rotation of an output drive of an impact tool, the method comprising the steps of:

providing an impact mechanism that includes a hammer and an anvil, the hammer being rotatable about a first axis and to periodically impact the anvil to drive rotation of the anvil about the first axis, wherein the anvil rotates an output drive about the first axis, a brushless DC motor having a plurality of pole pairs of windings and a rotor that is rotatable with respect to consecutively energized pole pairs of windings of the plurality of pole pairs of windings, a motor controller, a trigger, and a power source, wherein no encoder or sensor is integrated to the brushless DC motor to detect a position of at least one magnet attached to the rotor with respect to at least one pole pair of the plurality of pole pairs of windings;

actuating the trigger;

supplying electricity to the motor controller from the power source in response to actuating the trigger;

energizing a first set of pairs of the plurality of pole pairs in a first order while a resistance to rotation of the rotor prevents the energized first set of pairs from moving the rotor;

determining no movement of the rotor occurs;

rotating the rotor of the brushless DC motor from rest by one revolution or less by energizing a second set of pairs of the plurality of pole pairs in a second order;

generating a back electromagnetic force from the rotating rotor; and detecting the relative position of the rotor with respect to the plurality of pole pairs of windings based on rotating the rotor of the brushless DC motor from rest to one revolution or less.

* * * * *